(12) United States Patent
Bran et al.

(10) Patent No.: US 9,392,090 B2
(45) Date of Patent: Jul. 12, 2016

(54) LOCAL WIRELESS LINK QUALITY NOTIFICATION FOR WEARABLE AUDIO DEVICES

(71) Applicant: Plantronics, Inc., Santa Cruz, CA (US)

(72) Inventors: Cary Bran, Seattle, WA (US); Shantanu Sarkar, San Jose, CA (US); Timothy P Johnston, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 131 days.

(21) Appl. No.: 14/137,032

(22) Filed: Dec. 20, 2013

(65) Prior Publication Data

US 2015/0181010 A1 Jun. 25, 2015

(51) Int. Cl.
*H04B 1/38* (2015.01)
*H04M 1/60* (2006.01)
*H04M 1/725* (2006.01)

(52) U.S. Cl.
CPC ........ *H04M 1/6066* (2013.01); *H04M 1/72572* (2013.01)

(58) Field of Classification Search
CPC .. H04M 1/0202; H04M 1/6066; H04W 24/06
USPC ......... 455/41, 41.2, 568, 73, 557, 452.1, 417, 455/41.3, 522, 67.11, 414.1, 501, 90.1; 370/338, 476, 329, 562.1, 575.2, 252; 704/227; 381/381, 370
See application file for complete search history.

(56) References Cited

U.S. PATENT DOCUMENTS

| | | | |
|---|---|---|---|
| 2002/0132585 A1* | 9/2002 | Palermo et al. | 455/41 |
| 2003/0091017 A1* | 5/2003 | Davenport et al. | 370/338 |
| 2005/0064890 A1* | 3/2005 | Johan et al. | 455/522 |
| 2005/0201585 A1* | 9/2005 | Jannard et al. | 381/381 |
| 2005/0271021 A1* | 12/2005 | Alemany | H04W 48/20 370/338 |
| 2008/0076478 A1* | 3/2008 | Russell et al. | 455/562.1 |
| 2008/0201138 A1* | 8/2008 | Visser et al. | 704/227 |
| 2008/0299948 A1* | 12/2008 | Rosener | H04M 1/6066 455/412.2 |
| 2010/0156624 A1* | 6/2010 | Hounsell | G08B 21/24 340/539.1 |
| 2010/0159840 A1* | 6/2010 | Rosener | G01S 11/06 455/67.11 |
| 2010/0302958 A1* | 12/2010 | Wietfeldt | H04W 76/025 370/252 |
| 2011/0269502 A1* | 11/2011 | Clark | H04B 1/006 455/552.1 |
| 2012/0082049 A1* | 4/2012 | Chen et al. | 370/252 |
| 2012/0171963 A1* | 7/2012 | Tsfaty | 455/41.3 |
| 2012/0257740 A1* | 10/2012 | Kannappan et al. | 379/211.01 |
| 2013/0295950 A1* | 11/2013 | Ruuska et al. | 455/452.1 |
| 2013/0297958 A1* | 11/2013 | Siegel | G06F 1/325 713/323 |
| 2013/0331034 A1* | 12/2013 | Tucker | H04M 1/6066 455/41.2 |
| 2014/0176297 A1* | 6/2014 | Mulder | G09B 21/009 340/4.14 |
| 2014/0201329 A1* | 7/2014 | Himayat | H04L 12/6418 709/219 |
| 2014/0206323 A1* | 7/2014 | Scorcioni | 455/414.1 |
| 2014/0226676 A1* | 8/2014 | Afkhami | H04L 47/6215 370/412 |
| 2014/0270211 A1* | 9/2014 | Solum | H04R 25/30 381/60 |

(Continued)

*Primary Examiner* — Tan H Trinh
(74) *Attorney, Agent, or Firm* — Richard A. Dunning, Jr.

(57) ABSTRACT

Computer-readable media embodying instructions executable by a computer in a wireless device to perform functions comprises: receiving first link quality data for a wireless link from a wearable wireless audio device connected to the wireless device by the wireless link; receiving second link quality data for the wireless link from a radio-frequency (RF) of the wireless device; determining a quality of the wireless link based on the first link quality data and the second link quality data; and causing a user-perceivable indication of the quality of the wireless link to be generated by at least one of i) the wearable wireless audio device, and ii) the wireless device.

20 Claims, 6 Drawing Sheets

(56) References Cited

U.S. PATENT DOCUMENTS

2014/0307638 A1* 10/2014 Zacharias et al. ............. 370/329
2014/0308939 A1* 10/2014 Goldman et al. ............. 455/417
2014/0341108 A1* 11/2014 Desai .................... H04L 5/0032
370/328

* cited by examiner

LOCAL WIRELESS LINK QUALITY NOTIFICATION FOR WEARABLE AUDIO DEVICES

FIELD

The present disclosure relates generally to the field of wireless communications. More particularly, the present disclosure relates to determination of wireless link quality.

BACKGROUND

Wearable wireless audio devices are exploding in popularity. While by far the most common wearable wireless audio device is the headset, other devices are surfacing, such as bracelets and the like. Each wearable wireless audio device receives or exchanges audio with another wireless device over a local wireless link. For example, a Bluetooth headset may exchange audio with a Bluetooth-capable smartphone over a Bluetooth link.

The quality of the audio is heavily dependent on the quality of the local wireless link. However, the only link quality indication available to a user lies in the perceivable quality of the audio, for example as revealed by audible clicks, periods of silence, and the like. Furthermore, this audible link quality is indicative of the entire end-to-end connection with another audio device. Therefore, the audio problems cannot be isolated to a particular link.

SUMMARY

In general, in one aspect, an embodiment features computer-readable media embodying instructions executable by a computer in a wireless device to perform functions comprising: receiving first link quality data for a wireless link from a wearable wireless audio device connected to the wireless device by the wireless link; receiving second link quality data for the wireless link from a radio-frequency (RF) transceiver of the wireless device; determining a quality of the wireless link based on the first link quality data and the second link quality data; and causing a user-perceivable indication of the quality of the wireless link to be generated by at least one of i) the wearable wireless audio device, and ii) the wireless device.

Embodiments of the computer-readable media may include one or more of the following features. In some embodiments, the first link quality data and the second link quality data comprise at least one of: a received signal strength indication; a dropped packets indication; and a corrupted packets indication. In some embodiments, the user-perceivable indication of the quality of the wireless link indicates a sufficiency of the wireless link to support a voice call. In some embodiments, the functions further comprise: generating a wireless link quality map based on the quality of the wireless link and a location where the quality of the wireless link was determined. In some embodiments, wherein the wearable wireless audio device is a first wearable wireless audio device, wherein the wireless link is a first wireless link, wherein the location of the wireless device is a first location, the functions further comprise: receiving third link quality data for a second wireless link from a second wearable wireless audio device connected to the wireless device by a second wireless link; receiving fourth link quality data for the second wireless link from the RF transceiver; determining a quality of the second wireless link based on the third link quality data and the fourth link quality data; and modifying the wireless link quality map based on the quality of the second wireless link and a location where the quality of the second wireless link was determined. In some embodiments, the functions further comprise: conducting a test call to another audio device; and causing a user-perceivable indication of the quality of the test call to be generated by at least one of i) the wearable wireless audio device, and ii) the wireless device.

In general, in one aspect, an embodiment features computer-readable media embodying instructions executable by a computer in a wireless device to perform functions comprising: providing a wireless link quality map, wherein the wireless link quality map comprises a respective wireless link quality for each of a plurality of locations; and generating a predicted quality of a wireless link between the wireless device and a wearable wireless audio device based on a location of the wireless device and the wireless link quality map.

Embodiments of the computer-readable media may include one or more of the following features. In some embodiments, the functions further comprise: causing a user-perceivable indication of the predicted quality of the wireless link to be generated by at least one of i) the wearable wireless audio device, and ii) the wireless device. In some embodiments, the functions further comprise: generating user-perceivable navigation instructions based on the location of the wireless device and the wireless link quality map; and providing the user-perceivable navigation instructions to at least one of i) the wearable wireless audio device, and ii) the wireless device. In some embodiments, the functions further comprise: providing the user-perceivable navigation instructions responsive to knowledge of an imminent event. In some embodiments, the functions further comprise: receiving the wireless link quality map from a server remote from the wireless device. In some embodiments, the functions further comprise: receiving first link quality data for the wireless link from the wearable wireless audio device; receiving second link quality data for the wireless link from an RF transceiver of the wireless device; and determining a quality of the wireless link based on the first link quality data and the second link quality data. In some embodiments, the first link quality data and the second link quality data comprise at least one of: a received signal strength indication; a dropped packets indication; and a corrupted packets indication. In some embodiments, the functions further comprise: causing a user-perceivable indication of the quality of the wireless link to be generated by at least one of i) the wearable wireless audio device, and ii) the wireless device. In some embodiments, the user-perceivable indication of the quality of the wireless link indicates a sufficiency of the wireless link to support a voice call. In some embodiments, the functions further comprise: modifying the wireless link quality map based on the quality of the wireless link and a location where the quality of the wireless link was determined.

In general, in one aspect, an embodiment features computer-readable media embodying instructions executable by a computer to perform functions comprising: receiving a plurality of localized wireless link quality reports, wherein each of the localized wireless link quality reports includes i) a quality of a respective wireless link between a respective wearable wireless audio device and a respective wireless device, and ii) a respective location where the quality of the respective wireless link was determined; and generating a wireless link quality map based on the plurality of localized wireless link quality reports.

Embodiments of the computer-readable media may include one or more of the following features. In some embodiments, each of the localized wireless link quality reports represents at least one of: a received signal strength indication; a dropped packets indication; and a corrupted packets indication. In some embodiments, the functions further comprise: sending the wireless link quality map to one of the wireless devices. In some embodiments, generating the wireless link quality map comprises: generating a respective wireless link quality index for each of a plurality of locations based on the plurality of localized wireless link quality reports.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present disclosure provide local wireless link quality notifications for wearable wireless audio devices. That is, a notification may be provided to a wearer of a wearable wireless audio device, where the notification indicates a quality of the local wireless link with the wearable wireless audio device. The notification may include a user-perceivable indication of the quality of the wireless link. The notification may be provided by the wearable wireless audio device, by the wireless device connected to the wearable wireless audio device by the wireless link, or by both. The quality of the wireless link may be based on the link quality data generated by the wearable wireless audio device, by the wireless device connected to the wearable wireless audio device, or both. The link quality data may include a received signal strength indication, a dropped packets indication, a corrupted packets indication, or the like, or any combination thereof. Other features are contemplated as well.

Figure 1:
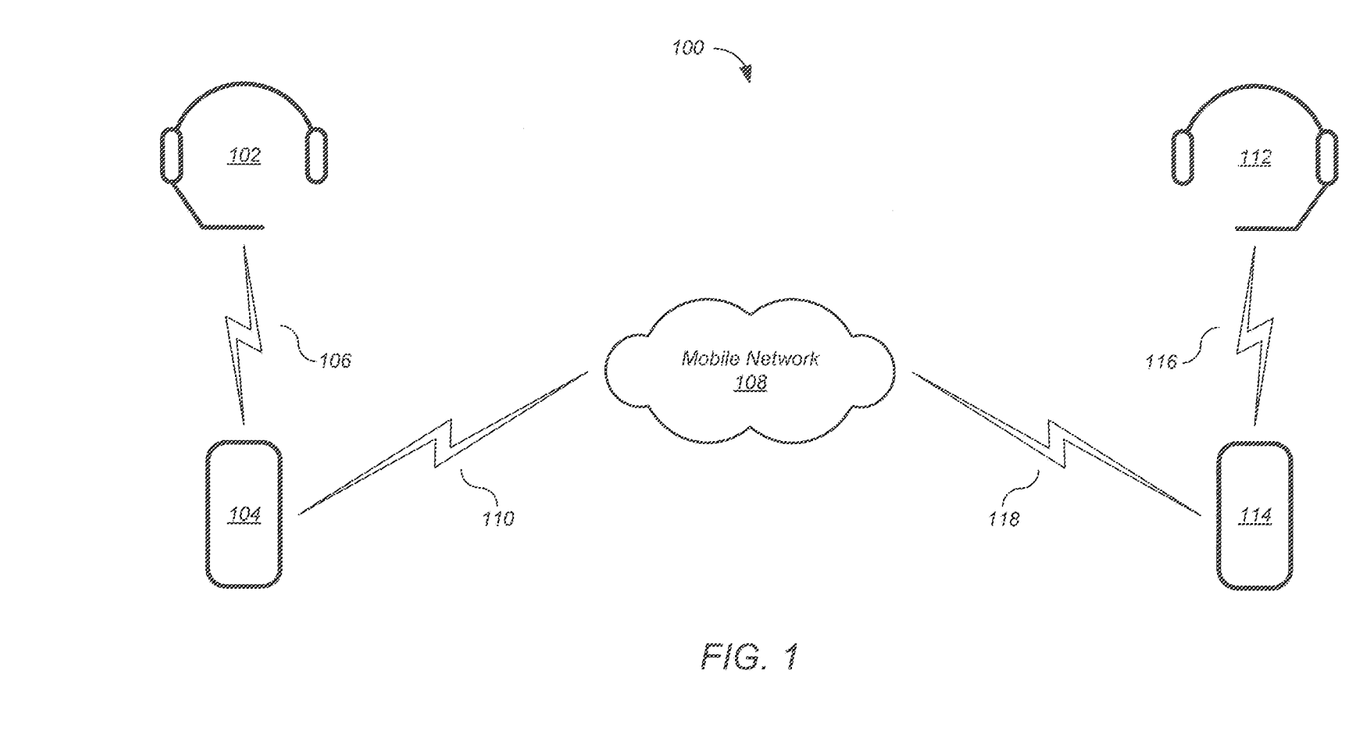
FIG. 1 illustrates a system for conducting a telephone call.

FIG. 1 illustrates a system 100 for conducting a telephone call. Referring to FIG. 1, a first headset 102 is connected to a first smartphone 104 by a first wireless link 106. The first smartphone 104 is connected to a mobile network 108 by a second wireless link 110. A second headset 112 is connected to a second smartphone 114 by a third wireless link 116. The second smartphone 114 is connected to the mobile network 108 by a fourth wireless link 118. Audio quality problems perceived during the telephone call may be caused by any of the wireless links 106, 110, 116, 118, or even within the mobile network 108. The described embodiments allow users of the headsets 102, 112 to determine whether the problems are occurring in their local wireless links 110, 114.

Figure 2:
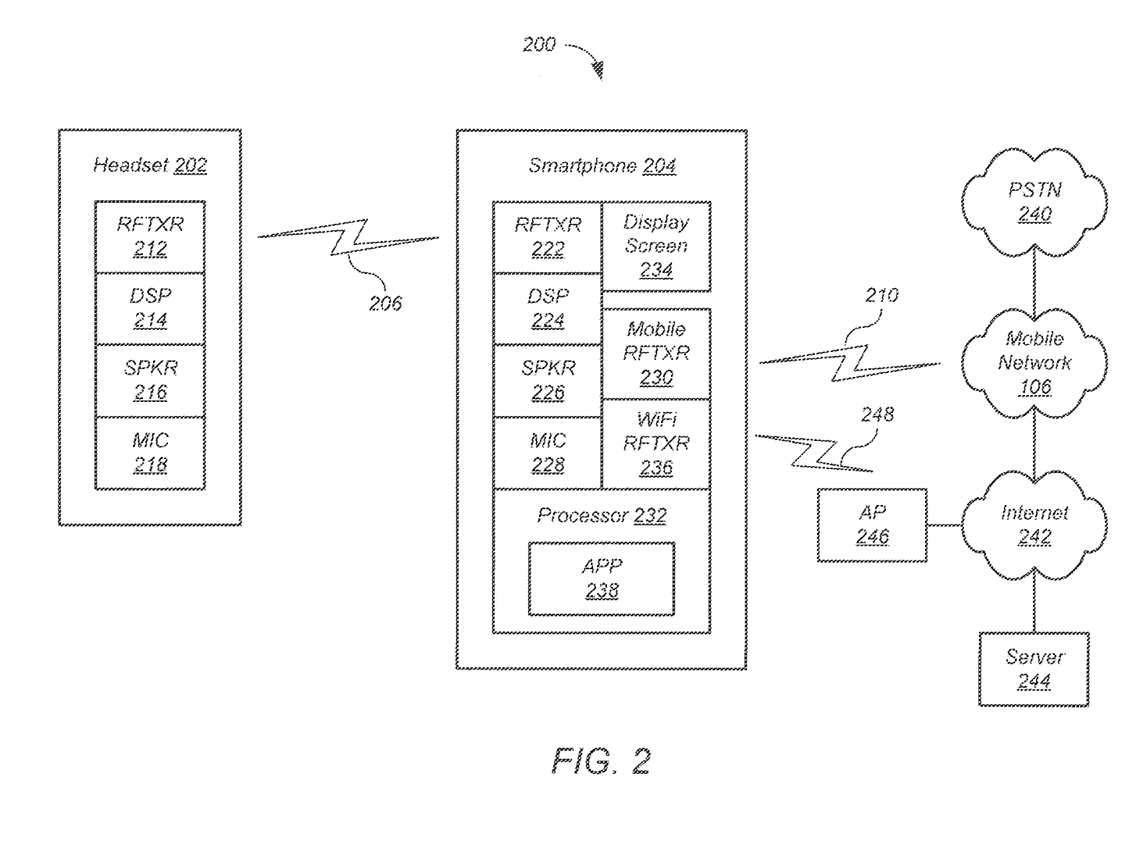
FIG. 2 shows elements of a wearable wireless audio system according to one embodiment.

FIG. 2 shows elements of a wearable wireless audio system 200 according to one embodiment. Although in the described embodiment elements of the system 200 are presented in one arrangement, other embodiments may feature other arrangements. For example, elements of the system 200 may be implemented in hardware, software, or combinations thereof.

Referring to FIG. 2, the wearable wireless audio system 200 includes a headset 202 and a smartphone 204. In the present disclosure, the system 200 is described in terms of a headset and a smartphone. However, the techniques described herein are applicable to any system having a wearable wireless audio device connected by a wireless link to another wireless device.

The headset 202 and the smartphone 204 are connected by a wireless link 206. The wireless link 206 may be a Bluetooth link, a DECT link, a WiFi link, or the like. The smartphone 204 is connected to a mobile network 208 by a mobile wireless link 210. The mobile network 208 may be connected to other networks, such as the public switched telephone network (PSTN) 240, the Internet 242, and the like. In some embodiments, the headset 202 may include a WiFi radio-frequency (RF) transceiver (RFTXR) 236, and may connect to the Internet 242 through an access point (AP) 246 and a WiFi link 248.

The headset 202 includes an RF transceiver (RFTXR) 212, a digital signal processor (DSP) 214, a loudspeaker (SPKR) 216, and a microphone (MIC) 218. The smartphone 204 includes an RF transceiver (RFTXR) 222, a DSP 224, a loudspeaker 226, a microphone 228, a mobile RF transceiver 230, WiFi RF transceiver 236, a processor 232, and a display screen 234. In the example of FIG. 2, the processor 232 executes an application (APP) 238. In other embodiments, the application 238 may be executed by other processors, for example in the headset 202, in a server 244 connected to the Internet, or in a combination thereof.

Figure 3:
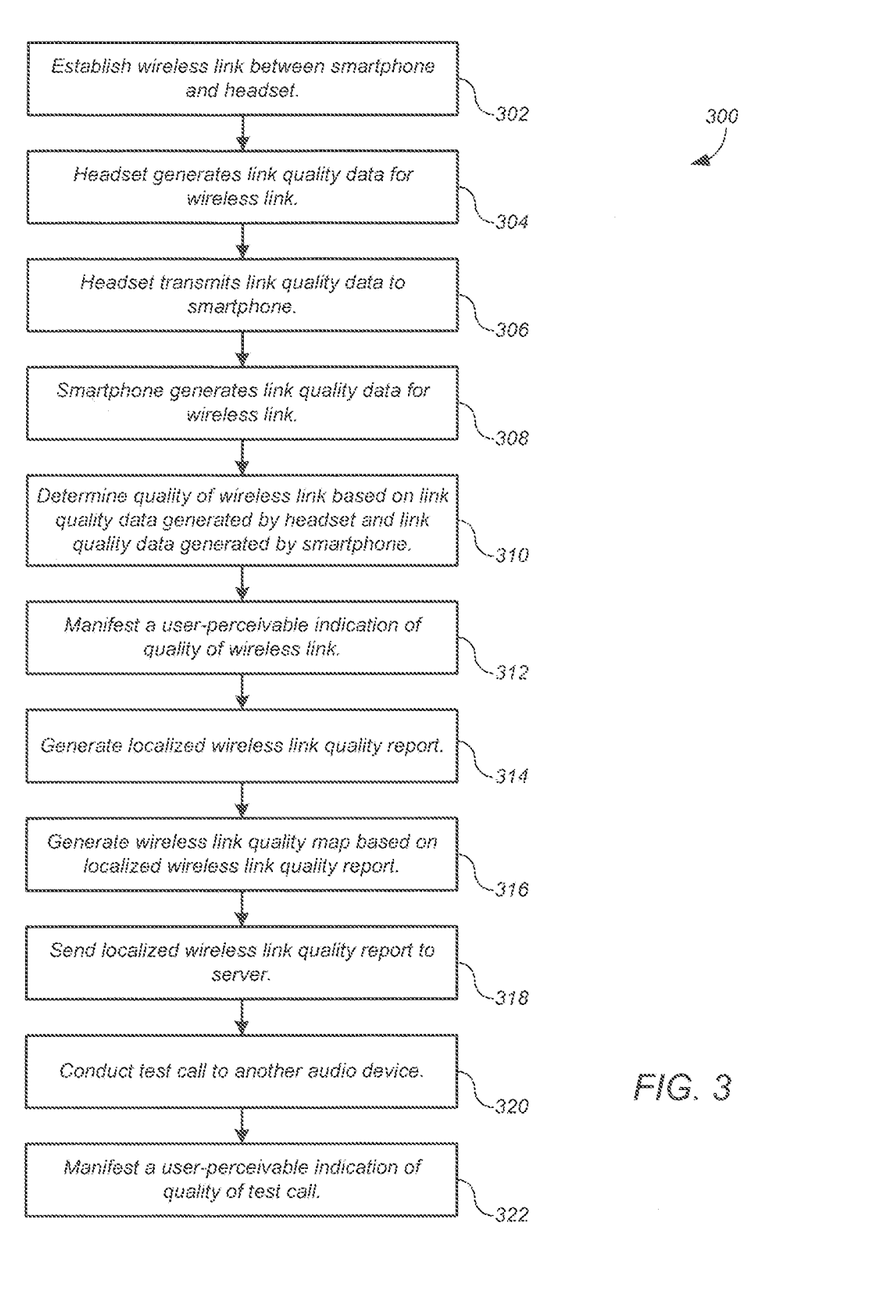
FIG. 3 shows a link quality notification process for the wearable wireless audio system of FIG. 2 according to one embodiment.

FIG. 3 shows a link quality notification process 300 for the wearable wireless audio system 200 of FIG. 2 according to one embodiment. Although in the described embodiments the elements of process 300 are presented in one arrangement, other embodiments may feature other arrangements. For example, in various embodiments, some or all of the elements of process 300 may be executed in a different order, concurrently, and the like. Also some elements of process 300 may not be performed, and may not be executed immediately after each other. In addition, some or all of the elements of process 300 may be performed automatically, that is, without human intervention.

Referring to FIG. 3, at 302, the smartphone 204 establishes a wireless link 206 with the headset 202. That is, the wireless link 206 is established between the RF transceiver 212 of the headset 202 and the RF transceiver 222 of the smartphone 204. Packets of data are then exchanged across the wireless link 206. At 304, the headset 202 generates link quality data for the wireless link 206. For example, the RF transceiver 212 of the headset 202 determines a received signal strength indication (RSSI) of the wireless signal received from the smartphone 204, and the DSP 214 of the headset 202 generates an indication of the number of dropped packets, the number of corrupted packets, and the like. At 306, the headset 202 transmits the link quality data to the smartphone 204. At 308, the smartphone 204 also generates link quality data for the wireless link 206. For example, the RF transceiver 222 of the smartphone 204 determines an RSSI of the wireless signal received from the headset 202, and the DSP 224 of the smartphone 204 generates an indication of the number of dropped packets, the number of corrupted packets, and the like.

At 310, the application 238 executing on the processor 232 determines a quality of the wireless link 206 based on the link quality data generated by the headset 202 and link quality data generated by the smartphone 204. The determination of the quality of the wireless link 206 may involve any combination of the link quality data generated by the headset 202 and the smartphone 204. For example, the determination may involve calculating averages, weighted averages, and the like. The quality of the wireless link 206 may be expressed in any form. For example, the quality may be expressed on a scale from one to four. As another example, the quality may be expressed in terms of a sufficiency of the wireless link 206 to support a voice call.

At 312, responsive to the application 238 determining a quality of the wireless link 206, the processor 232 causes the headset 202, the smartphone 204, or both to manifest a user-perceivable indication of the quality of the wireless link 206. For example, the processor 232 may send an audio message to the headset 202 that indicates the quality of the wireless link 206 and, responsive to receiving that message, the headset 202 may play the message over its loudspeaker 216.

In some embodiments, at 314, the smartphone 204 generates a localized wireless link quality report. Each localized wireless link quality report includes a quality of the wireless link 206 between the headset 202 and the smartphone 204, and the location where the quality of the wireless link 206 was determined. In some embodiments, at 316, the smartphone 204 generates a wireless link quality map based on the localized wireless link quality report, for example as described below. In some embodiments, at 318, the smartphone 204 sends the localized wireless link quality report to the server 244, and the server 244 generates a wireless link quality map based on the reported quality.

In some embodiments, at 318, the smartphone 204 conducts a test call to another audio device. At 320, the processor 232 causes the headset 202, the smartphone 204, or both to manifest a user-perceivable indication of the quality of the test call. For example, the processor 232 may send an audio message to the headset 202 that indicates the quality of the test call and, responsive to receiving that message, the headset 202 may play the message over its loudspeaker 216.

Figure 4:
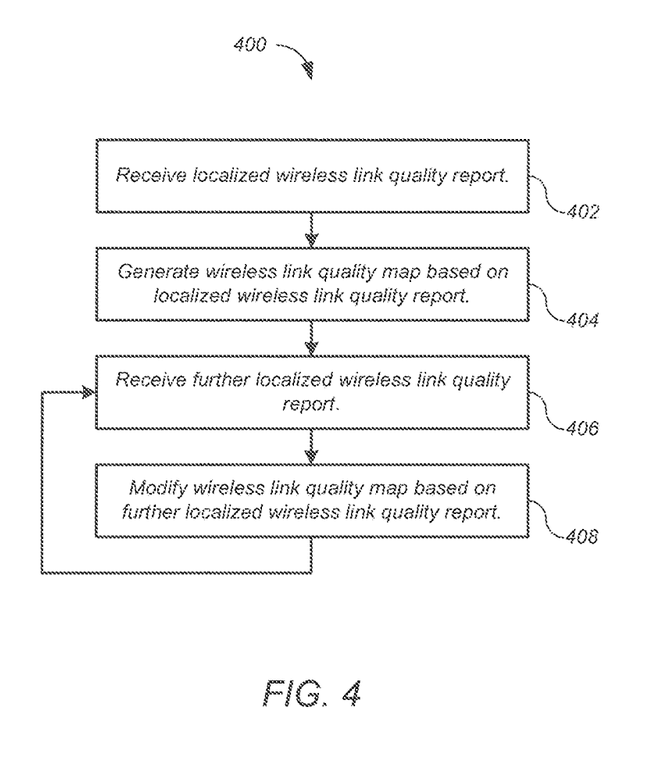
FIG. 4 shows a wireless link quality mapping process for the server of FIG. 2 according to one embodiment.

FIG. 4 shows a wireless link quality mapping process 400 for the server 244 of FIG. 2 according to one embodiment. Although in the described embodiments the elements of process 400 are presented in one arrangement, other embodiments may feature other arrangements. For example, in various embodiments, some or all of the elements of process 400 may be executed in a different order, concurrently, and the like. Also some elements of process 400 may not be performed, and may not be executed immediately after each other. In addition, some or all of the elements of process 400 may be performed automatically, that is, without human intervention. In some embodiments, the mapping process is performed by the smartphone 204 or by both the smartphone 204 and the server 244.

Referring to FIG. 4, at 402, the server 244 receives a localized wireless link quality report. Each localized wireless link quality report includes a quality of a wireless link 206 between a headset 202 and a smartphone 204 and the location where the quality of the wireless link 206 was determined. For example, the smartphone 204 may determine the quality of the wireless link 206 as described above with reference to FIG. 3. The smartphone 204 may also determine its location at the time the quality of the wireless link 206 was determined. The smartphone 204 may then associate the location and link quality to form a localized wireless link quality report, and then transmit the report to the server 244.

At 404, the server 244 generates a wireless link quality map based on the localized wireless link quality report. Any technique may be used to generate the wireless link quality map. For example, the server 244 may generate a wireless link quality index for the reported location based on the reported quality of the wireless link. The wireless link quality index may be expressed on a scale from one to four, for example. The map may be a heat map. For example, the heat map may be generated by digitally filtering the array of wireless link quality indices, or the like.

At 406, the server 244 receives a further localized wireless link quality report. At 408, the server 244 modifies the wireless link quality map based on the further localized wireless link quality report. For example, if the reported location has no wireless link quality index in the map, the server 244 generates a wireless link quality index for the reported location in the map based on the reported quality of the wireless link 206. But if the reported map location has a wireless link quality index, the server 244 modifies the wireless link quality index for that map location based on existing wireless link quality index and the reported quality of the wireless link. The process 400 may resume, at 404.

Figure 5:
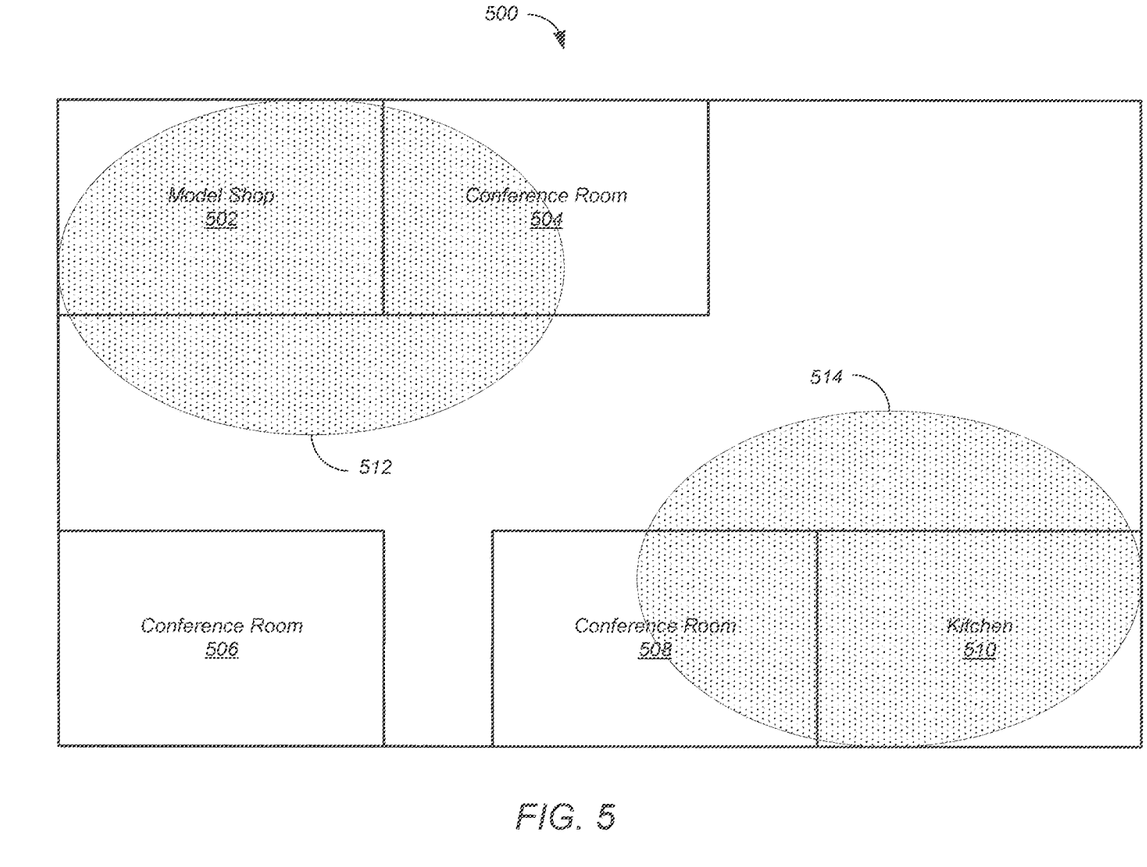
FIG. 5 shows an example wireless link quality map according to one embodiment.

FIG. 5 shows an example wireless link quality map according to one embodiment. The wireless link quality map shows a building having a model shop 502, three conference rooms 504, 506, 508, and a kitchen 510. In this example, the wireless link quality map is a heat map having only two values: acceptable and unacceptable. The wireless link quality map shows two areas of unacceptable wireless link quality. One area 512 is associated with the model shop 502, and could be caused by modeling machinery. Another area 514 is associated with the kitchen 502, and could be caused by a microwave oven. The remaining areas of the building 500 have acceptable wireless link quality. A user consulting the map to choose a conference room for a call would probably avoid conference rooms 504 and 508, which are partially covered by areas 512 and 514 respectively, and would probably choose conference room 506, which is not covered by either of those areas 512, 514.

Figure 6:
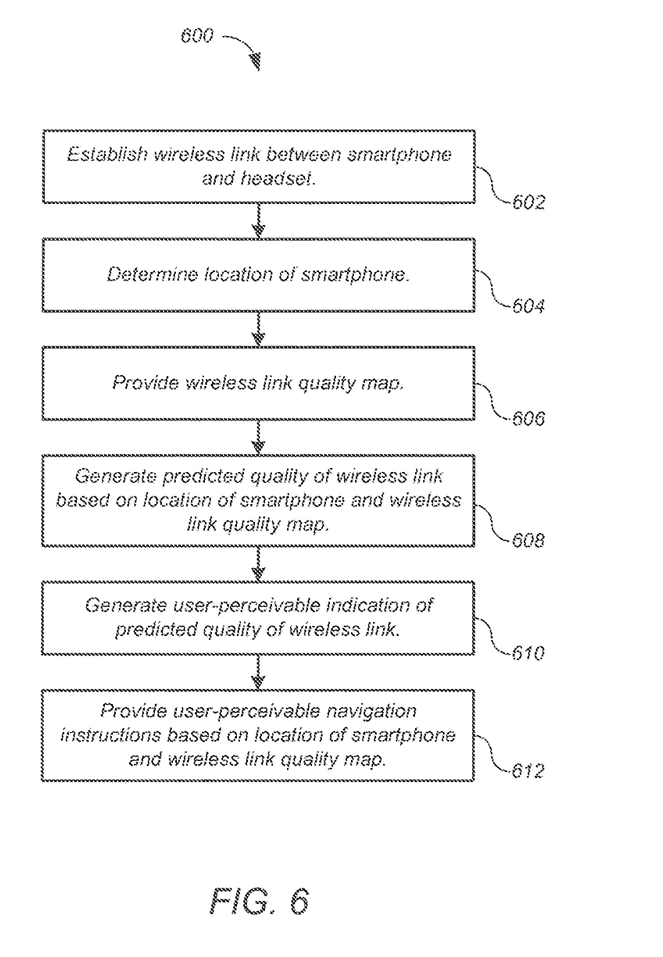
FIG. 6 shows a wireless link quality map utilization process for the smartphone of FIG. 2 according to one embodiment.

In some embodiments, the wireless link quality map is used to predict the quality of a wireless link 206 based on the location of the smartphone 204. FIG. 6 shows a wireless link quality map utilization process 600 for the smartphone 204 of FIG. 2 according to one embodiment. Although in the described embodiments the elements of process 600 are presented in one arrangement, other embodiments may feature other arrangements. For example, in various embodiments, some or all of the elements of process 600 may be executed in a different order, concurrently, and the like. Also some elements of process 600 may not be performed, and may not be executed immediately after each other. In addition, some or all of the elements of process 600 may be performed automatically, that is, without human intervention.

Referring to FIG. 6, at 602, the smartphone 204 establishes a wireless link 206 with the headset 202. At 604, the smartphone 204 determines its location. The smartphone 204 may determine its location in any manner. For example, the location may be determined using triangulation on signals such as global positioning system (GPS) signals, digital television signals, cellular signals, WiFi signals, or the like, using inertial navigation or the like, or any combination thereof.

At 606, the smartphone 204 provides a wireless link quality map. In some embodiments, the wireless link quality map may be generated by the smartphone 204, and may be stored in the smartphone 204. In some embodiments, the wireless link quality map is generated by the server 244, and is sent to the smartphone 204 by the server 244.

At 608, the smartphone 204 generates a predicted quality of the wireless link 206 based on the location of the smartphone 204 and the wireless link quality map. For example, the predicted quality of the wireless link 206 may be the wireless link quality index associated with the location of the smartphone 204 by the wireless link quality map.

At 610, the smartphone 204, the headset 202, or both generates a user-perceivable indication of the predicted quality of the wireless link 206. For example, the processor 232 may send an audio message to the headset 202 that indicates the predicted quality of the wireless link 206 and, responsive to receiving that message, the headset 202 may play the message over its loudspeaker 216. As another example, the smartphone 204 may display the indication of the predicted quality of the wireless link 206 on its display screen 234. For example, the display screen 234 may show a heat map with the location of the smartphone 204 indicated thereon. The user-perceivable indication of the quality of the wireless link 206 may indicate a sufficiency of the wireless link 206 to support a voice call.

In some embodiments, at 612, the smartphone 204 provides user-perceivable navigation instructions based on the location of the smartphone 204 and the wireless link quality map. For example, the instructions may guide the user away from areas where the predicted quality of the wireless link 206 is low, toward areas where the predicted quality of the wireless link 206 is high, and the like.

In some embodiments, the smartphone 204 provides the user-perceivable navigation instructions responsive to knowledge of an imminent event. For example, the smartphone 204 may determine a call is scheduled to begin soon, and therefore guide the user to a location indicated by the wireless link quality map as having a high predicted quality of the wireless link 206.

Various embodiments of the present disclosure may be implemented in digital electronic circuitry, or in computer hardware, firmware, software, or in combinations thereof. Embodiments of the present disclosure may be implemented in a computer program product tangibly embodied in a computer-readable storage device for execution by a programmable processor. The described processes may be performed by a programmable processor executing a program of instructions to perform functions by operating on input data and generating output. Embodiments of the present disclosure may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure, other implementations are within the scope of the following claims.

What is claimed is:

1. Computer-readable non-transitory media embodying instructions executable by a computer in a wireless device to perform functions comprising:
   receiving first link quality data for a wireless link from a wearable wireless audio device connected to the wireless device by the wireless link;
   receiving second link quality data for the wireless link from a radio-frequency (RF) transceiver of the wireless device;
   determining a quality of the wireless link based on the first link quality data and the second link quality data; and
   causing a user-perceivable indication of the quality of the wireless link to be generated by at least one of
   i) the wearable wireless audio device, and
   ii) the wireless device.

2. The computer-readable non-transitory media of claim 1, wherein the first link quality data and the second link quality data comprise at least one of:
   a received signal strength indication;
   a dropped packets indication; and
   a corrupted packets indication.

3. The computer-readable non-transitory media of claim 1, wherein:
   the user-perceivable indication of the quality of the wireless link indicates a sufficiency of the wireless link to support a voice call.

4. The computer-readable non-transitory media of claim 1, wherein the functions further comprise:
   generating a wireless link quality map based on the quality of the wireless link and a location where the quality of the wireless link was determined.

5. The computer-readable non-transitory media of claim 4, wherein the wearable wireless audio device is a first wearable wireless audio device, wherein the wireless link is a first wireless link, wherein the location of the wireless device is a first location, and wherein the functions further comprise:
   receiving third link quality data for a second wireless link from a second wearable wireless audio device connected to the wireless device by a second wireless link;
   receiving fourth link quality data for the second wireless link from the RF transceiver;
   determining a quality of the second wireless link based on the third link quality data and the fourth link quality data; and
   modifying the wireless link quality map based on the quality of the second wireless link and a location where the quality of the second wireless link was determined.

6. The computer-readable non-transitory media of claim 1, wherein the functions further comprise:
   conducting a test call to another audio device; and
   causing a user-perceivable indication of the quality of the test call to be generated by at least one of
   i) the wearable wireless audio device, and
   ii) the wireless device.

7. Computer-readable non-transitory media embodying instructions executable by a computer in a wireless device to perform functions comprising:
   providing a wireless link quality map, wherein the wireless link quality map comprises a respective wireless link quality for each of a plurality of locations; and
   generating a predicted quality of a wireless link between the wireless device and a wearable wireless audio device based on a location of the wireless device and the wireless link quality map.

8. The computer-readable non-transitory media of claim 7, wherein the functions further comprise:
   causing a user-perceivable indication of the predicted quality of the wireless link to be generated by at least one of
   i) the wearable wireless audio device, and
   ii) the wireless device.

9. The computer-readable non-transitory media of claim 7, wherein the functions further comprise:
   generating user-perceivable navigation instructions based on the location of the wireless device and the wireless link quality map; and
   providing the user-perceivable navigation instructions to at least one of
   i) the wearable wireless audio device, and
   ii) the wireless device.

10. The computer-readable non-transitory media of claim 9, wherein the functions further comprise:
   providing the user-perceivable navigation instructions responsive to knowledge of an imminent event.

11. The computer-readable non-transitory media of claim 7, wherein the functions further comprise:
   receiving the wireless link quality map from a server remote from the wireless device.

12. The computer-readable non-transitory media of claim 7, wherein the functions further comprise:
   receiving first link quality data for the wireless link from the wearable wireless audio device;
   receiving second link quality data for the wireless link from a radio-frequency (RF) transceiver of the wireless device; and
   determining a quality of the wireless link based on the first link quality data and the second link quality data.

13. The computer-readable non-transitory media of claim 12, wherein the first link quality data and the second link quality data comprise at least one of:
   a received signal strength indication;
   a dropped packets indication; and
   a corrupted packets indication.

14. The computer-readable non-transitory media of claim 12, wherein the functions further comprise:
   causing a user-perceivable indication of the quality of the wireless link to be generated by at least one of
   i) the wearable wireless audio device, and
   ii) the wireless device.

15. The computer-readable non-transitory media of claim 14, wherein:
   the user-perceivable indication of the quality of the wireless link indicates a sufficiency of the wireless link to support a voice call.

16. The computer-readable non-transitory media of claim 12, wherein the functions further comprise:
   modifying the wireless link quality map based on the quality of the wireless link and a location where the quality of the wireless link was determined.

17. Computer-readable non-transitory media embodying instructions executable by a computer to perform functions comprising:
   receiving a plurality of localized wireless link quality reports, wherein each of the localized wireless link quality reports includes
   i) a quality of a respective wireless link between a respective wearable wireless audio device and a respective wireless device, and
   ii) a respective location where the quality of the respective wireless link was determined; and
   generating a wireless link quality map based on the plurality of localized wireless link quality reports.

18. The computer-readable non-transitory media of claim 17, wherein each of the localized wireless link quality reports represents at least one of:
   a received signal strength indication;
   a dropped packets indication; and
   a corrupted packets indication.

19. The computer-readable non-transitory media of claim 17, wherein the functions further comprise:
   sending the wireless link quality map to one of the wireless devices.

20. The computer-readable non-transitory media of claim 17, wherein generating the wireless link quality map comprises:
   generating a respective wireless link quality index for each of a plurality of locations based on the plurality of localized wireless link quality reports.

* * * * *